Oct. 20, 1931.  C. H. MICKELSEN  1,828,610
RESTRAINING DEVICE
Filed May 19, 1930
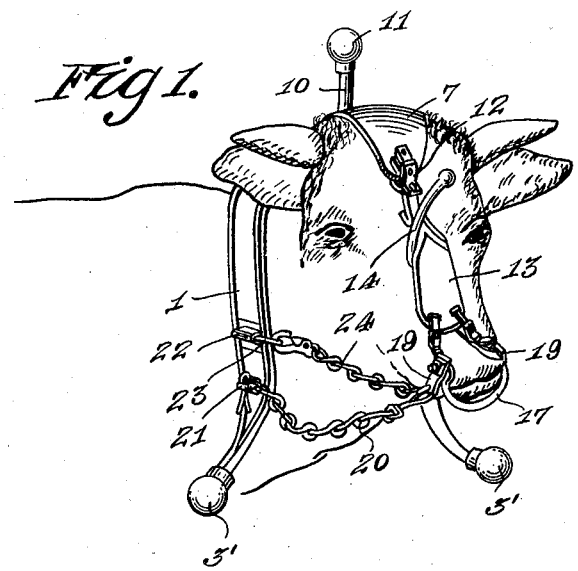
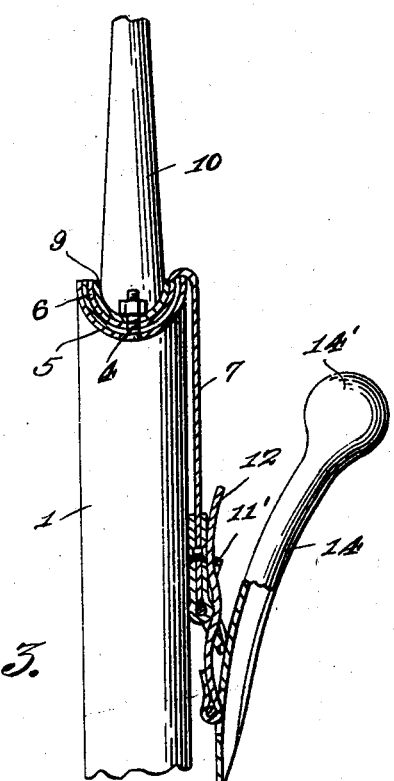
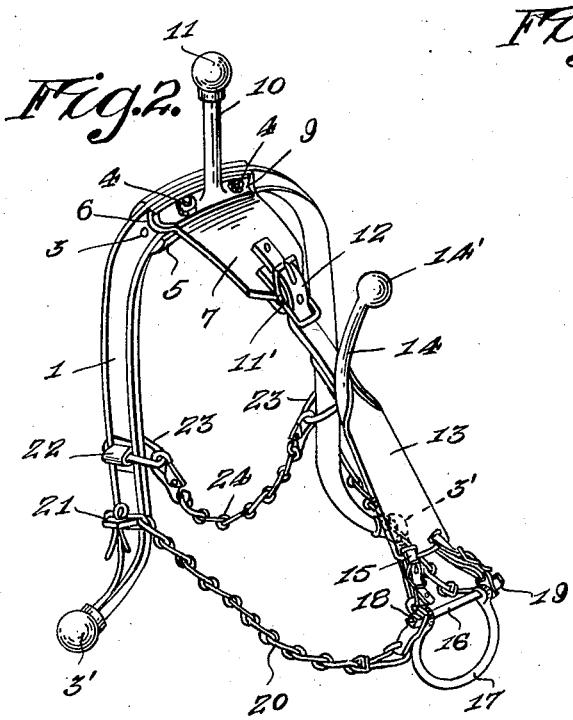
Canute H. Mickelsen,
INVENTOR
BY Victor J. Evans
ATTORNEY
WITNESS:

Patented Oct. 20, 1931

1,828,610

UNITED STATES PATENT OFFICE

CANUTE H. MICKELSEN, OF LAVA HOT SPRINGS, IDAHO

RESTRAINING DEVICE

Application filed May 19, 1930. Serial No. 453,826.

In my U. S. Letters Patent, 1,724,768, granted me on August 13, 1929, I provide a restraining device for bulls which will prevent the animal passing through a fence and which will likewise prevent the animal from running.

The object of this, my present invention is the provision of an attachment that will prevent the bull or like animal from butting and which will render the animal docile.

To the attainment of the foregoing the invention consists in the improvement hereinafter described and definitely claimed.

In the drawings:

Figure 1 is a perspective view of the improvement in applied position.

Figure 2 is a perspective view of the improvement per se.

Figure 3 is a sectional view to illustrate the manner in which the face plate is attached to the yoke.

In general my improvement resides in the construction disclosed in my Patent 1,724,768 but it will be noted as the description progresses that there is a material difference between the two constructions. In carrying out my invention I employ a yoke 1 designed to be arranged over the neck to the rear of the head of the bull. In counter-distinction to my patented device this yoke is substantially cross sectionally shaped throughout its length and, therefore, offers no abrupt contacting surfaces with the neck of the bull. The yoke merges into inwardly directed ends and to these ends there are secured ball heads 2. The central and channeled portion of the yoke is provided with any desired number of spaced apertures 3, and through certain of these apertures there are passed securing means 4 that attach to the under face of the yoke a pad 5 and to the upper face thereof the grooved and U-shaped portion 6 of a head plate 7. The head plate is engaged by the cross sectionally U-shaped portion 9 of a poke. The poke includes an outstanding arm 10 that merges into a head 11. The securing means 9 attach the poke and the head plate together.

The head plate 7 may be of any desired material and is designed to be arranged over the forehead of the bull, above his eyes. The outer end of the head plate is preferably V-shaped and has secured thereto a buckle 11' designed to be engaged by a strap 12 on the upper end of the face plate 13 of the improvement.

The face plate is of metal and has its outer edges rounded inwardly and extended to provide an angle and outwardly rounded arm 14 that merges into a round head 14'.

The outer and lower edge of the face plate 13 is provided with spaced openings for the reception of adjustable elements, such as straps 15 that connect thereto a bar 16 designed to be passed through the opening in the nostril of the animal. The bar 16 has its outer ends threaded and the said threaded ends are engaged by nuts. The ends of the bar receive therethrough the ends of a substantially U-shaped member 17 and likewise the nuts 18 contact with clips 19 at the ends of side chains 20 which are removably and adjustably secured by means 21 adjacent to the ends of the cross sectionally U-shaped yoke 1.

There is arranged in the channeled or U-shaped portion above the elements 21 adjustable keeper members 22 that receive therethrough the end links 23 of a throat chain 24.

With my improvement it will be apparent that the face plate 7 may be adjustably connected with the yoke, that the poke provided by the arm 14 and head 14' and likewise the poke provided by the arm 10 and head 11 prevent the bull from butting, and attempting to pass through fences as the violent contact of the bar 16 with the nostrils will restrain him in such attempts. With my improvement it will also be apparent that a vicious bull may be readily rendered docile and it is believed that the foregoing description will fully set forth the construction and advantages of the device.

Having described the invention, I claim:

1. A bull restraining device which includes a yoke arranged around the neck of an animal having a nose piece engaging the nose of the animal and flexible means connecting the nose piece to the side members of the yoke and a face plate flexibly secured to the nose piece and having its upper end rounded outwardly and formed with a ball head and a flexible connection between the face plate and the top of the yoke.

2. A bull restraining device which includes a yoke to be arranged around the neck of the animal, flexible means for securing the yoke on the animal, a nose piece to be passed through the nostrils of the animal, a face plate removably and adjustably secured to the nose piece, said face plate having a reduced outwardly extending portion merging into a ball head and adjustable means for connecting the face plate to the top of the yoke.

3. A bull restraining device which includes a yoke which is U-shaped in cross section and which has its ends diverging away from each other and provided with ball-shaped elements, a head plate having a U-shaped end removably and adjustably secured to the top of the yoke, a face plate adjustably secured to the head plate, a bar designed to be passed through the nostril of the animal, adjustable means securing the bar to the face plate, a U-shaped member supported on the bar, a flexible connection between the ends of the bar and the sides of the yoke, and a neck member removably and adjustably secured to the sides of the yoke.

4. A bull restraining device including a yoke which is U-shaped in cross section which has its ends directed at an outward angle therefrom and terminating in ball heads, a metal head plate having a U-shaped end received in the yoke and removably and adjustably secured thereto, a pad on the yoke below the head plate, a removable poke fixed on the said end of the head plate, a face plate having its upper end merging into a poke removably and adjustably secured to the head plate, a bar, means for adjustably securing the bar to the face plate, a U-shaped element swivelly supported on the bar, flexible elements between the ends of the bar and the sides of the yoke, and a throat latch removably and adjustably secured to the side arms of the yoke.

In testimony whereof I affix my signature.

CANUTE H. MICKELSEN.